United States Patent [19]

Laughlin

[11] Patent Number: 4,802,857

[45] Date of Patent: Feb. 7, 1989

[54] CPR MASK

[76] Inventor: Patrick E. Laughlin, 1191 Beechwood Dr., Green Bay, Wis. 54303

[21] Appl. No.: 124,289

[22] Filed: Nov. 23, 1987

[51] Int. Cl.[4] ............................................. G09B 23/28
[52] U.S. Cl. .................................................. 434/265
[58] Field of Search ...................... 434/265; 128/132 R

[56] References Cited

U.S. PATENT DOCUMENTS

| | | | |
|---|---|---|---|
| 3,068,590 | 12/1962 | Padellford | 434/265 |
| 3,152,404 | 10/1964 | Cheshire et al. | 434/265 |
| 3,625,351 | 12/1971 | Eisenberg | 206/484 |
| 3,994,075 | 11/1976 | Kohnke | 434/265 |
| 4,001,950 | 1/1977 | Blumensaadt | 434/265 |
| 4,050,457 | 9/1977 | Davidson | 128/132 R X |
| 4,331,426 | 5/1982 | Sweeney | 434/265 |
| 4,484,896 | 11/1984 | Kohnke | 434/265 |
| 4,611,998 | 9/1986 | Ramamurthy | 434/265 |

FOREIGN PATENT DOCUMENTS 240852 10/1962 Australia ............................ 434/265

OTHER PUBLICATIONS

Armstrong Medical Industries, Inc., Catalog 112, pp. 2, 8, 11, 55, 1-1988.
"Crash Kelly" CPR Trainer, pp. 1, 37, 1-1988.

*Primary Examiner*—William H. Grieb
*Attorney, Agent, or Firm*—Russell L. Johnson

[57] ABSTRACT

A disposable hygienic mask which is retrofitable to the nose and mouth contact areas of the face of an existing CPR dummy without damaging or permanently altering the face of the dummy. The mask is provided with filter chambers which are insertable in and indexed to the air passages of a CPR dummy and the chambers are configured to receive replaceable flexible filters. The mask, its securements, and its filters do not appreciably modify the flexibility, the functions, or the features of the CPR dummy to which it is attached.

17 Claims, 1 Drawing Sheet

CPR MASK

FIELD

This invention relates to devices for establishing and preserving hygienic conditions when using a practice dummy for the teaching of mouth to mouth or mouth to nose resuscitation techniques.

BACKGROUND

The teaching of cardiopulmonary resuscitation (CPR) techniques generally involves the use of CPR dummies rather than a live subject. The acceptability of these dummies is diminished by concerns about the passing of germs, blood, or saliva from user to user of these training devices.

The antiseptic wiping of the external contact surfaces of the face of the dummy is a mute witness to the absence in the art of a better way of establishing and maintaining of hygienic conditions in the mouth contact areas of CPR dummies.

OBJECTS

It is therefore an object of this invention to provide a mask that overlays the mouth and nose contact area of a CPR dummy and is sufficiently low in cost to be be disposable after use.

It is further an object of this invention to provide the mask described above wherein the mask is easily positioned, remains reliably in place during use, conforms to the contours of the face, is flexible and accommodating so as to permit pinching of nostrils and the opening and the closing of the mouth of the dummy when the mask is in place and the mask is easily removed after use.

Other objects will become apparent from the following specifications, claims, and drawings.

PRIOR ART

The patented prior art known to the inventor is:

| NUMBER | INVENTOR | DATE |
| --- | --- | --- |
| 0,240,852 (AUS) | BUCHANAN | OCT 1962 |
| 3,068,590 | PADELLFORD | DEC 1962 |
| 3,152,404 | CHESHIRE ET AL | OCT 1964 |
| 3,994,075 | KOHNKE | NOV 1976 |
| 4,001,950 | BLUMENSAADT | JAN 1977 |
| 4,331,426 | SWEENEY | MAY 1982 |
| 4,484,896 | KOHNKE | NOV 1984 |
| 4,611,998 | RAMAMURTHY | SEP 1986 |

If broad terminology is used, the prior art can be said to contain subject matter in common with the instant invention. However, the prior art does not teach or suggest the instant invention nor does the prior art achieve the ends achieved by the instant invention.

Specifically, the novel ends achieved by the mask of this invention are:

(1) the adaptability to use with existing CPR dummies with minimal loss of the original attributes of the dummy such as surface qualities, flexibility and movement, (2) the secure positioning on and attachment to the face portion of the dummy, (3) the provision of a filter structure in the air flow passages of the mask, and (4) the low unit cost of the mask which permits disposal of the mask after use.

Novel modes of operation of the mask of this invention are;

(1) the establishing of a hygienic barrier between the apparatus of the dummy and the user of the dummy such that germs and fluids such as saliva and blood are not passed from the user to the apparatus or from the apparatus to the user, (2) the quick and sure positioning and securement of the mask on the face of the dummy, and (3) the maintenance of hygienic conditions during use, and the quick and convenient removal and disposal of the mask after use.

BRIEF DESCRIPTION

A flexible and accommodating mask which is shaped to conform to the mouth and nose contact and adjacent areas of the lower face surfaces of a CPR training dummy. The mask is indexed to the mouth and nose air passages by means of filtering inserts which are a part of the mask. The mask is provided with a means for attaching the mask to and detaching the mask from the face portion of the dummy. The mask, the filters and the attachment means are completely adaptable to an existing CPR dummy without permanent alterations of the dummy or significant changes in the operation or physical properties of the training device.

DETAILED DESCRIPTION OF THE INVENTION

In the figures, like numbers refer to like objects. In the descriptions and claims when referring to the mask, the term "inside" shall refer to the side of the mask in contact with the face of the CPR dummy and "outside" shall refer to the user contact side of the mask.

Figure 1:
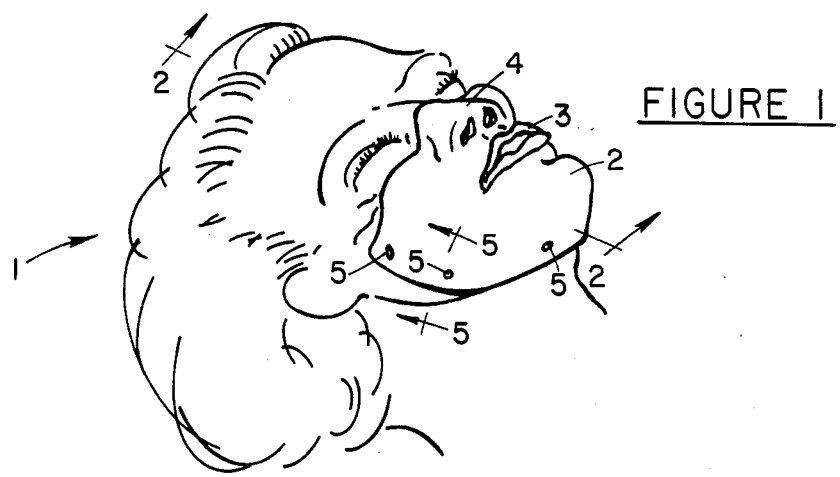
FIG. 1 is a pictorial view of the mask of this invention in place on the mouth and nose contact area of the face of a CPR dummy.

In FIG. 1 CPR dummy head 1 has hygienic mask 2 indexed to the mouth 3 and nose 4 of head 1. Mask 2 is secured to the face of dummy 1 by snaps 5 which are representative of the mask securement means useful in practicing this invention.

Figure 2:
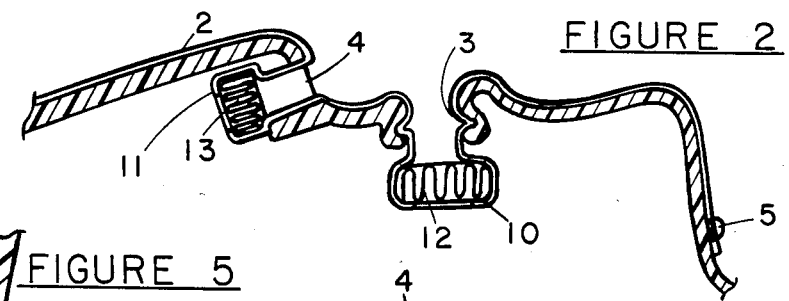
FIG. 2 is a cross sectioned elevational view of the masked portion of the face of FIG. 1.

FIG. 2 is a sectioned view along section lines 2—2 of FIG. 1. Mouth filter chamber 10 and one of the nose filter chambers 11 are shown in relation to the air passages in mouth 3 and nose 4 of mask 2.

Figure 4:
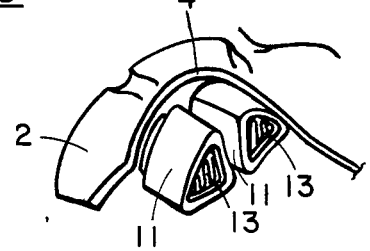
FIG. 4 is a sectioned fragmentary pictorial view of the nose filter chamber of the mask of this invention.
Figure 3:
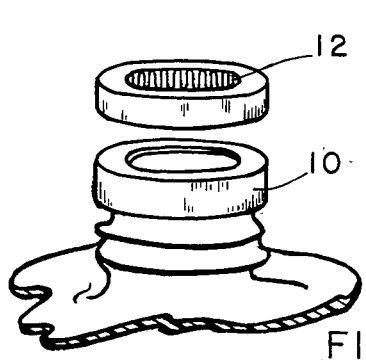
FIG. 3 is a fragmentary pictorial view of the mouth filter chamber of the mask of this invention.

In FIGS. 3 and 4 representative structures for filter chambers 10 and 11 are shown along with mouth filter 12 and nose filter 13.

Figure 5:
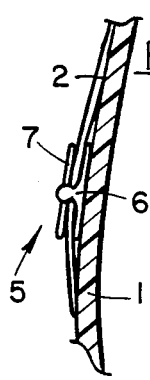
FIG. 5 is a sectioned elevational view of the snap attachment illustrated in FIG. 1.

FIG. 5 provides a sectioned view of a snap 5 showing the male snap member 6 adhered to the face portion of dummy head 1 and the female snap member 7 adhered to hygienic mask 2.

In use, mask 2 is retrofitable to the face portion of a CPR dummy head 1. To serve this utility, mask 2 must be formed from a relatively thin conformable material.

Mask 2 should be thin so as not to thicken or appreciably distort the features of the CPR dummy 1. Mask 2 should be accommodating so that the desired manipulations of the features of head 1 are not significantly changed. Such manipulations would include the pinching of nostrils and the opening and closing of the mouth. Relatively thin films of high quality latex rubber or neoprene rubber are presently preferred although other materials are suitable to serve this utility.

Untalced latex and neoprene have a strong tendency to cling. One embodiment of this invention leaves the inside of mask 2 untalced while applying talc to the outside of mask 2. In use the inside of mask 2 clings to the face portion of head 1 while the talced outside surface of mask 2 closely approximates the tactile properties of natural facial surfaces.

The cling of mask 2 may be sufficient to maintain the mask in position during use. However, for materials with less cling or those in which the cling has been reduced, it is seen as desirable to provide a positive means of positioning and securement. The indexing of nose filter chamber 11 and mouth filter chamber 10 to the openings in mouth 3 and nose 4 serve as positional indexes for the vital portions of the mask. A low cost positive means of attachment which is retrofitable to existing CPR dummy head 1 is represented by snaps 5.

One snap member such as male snap member 6 may be adhered or otherwise secured in place at locations around the periphery of the face of CPR dummy head 1. The other snap member, such as female snap member 7 may be incorporated into, or secured to a corresponding location on mask 2.

The same utility may be served by replacing snaps 5 with strips of male and female Velcro (TM) a product of the 3M Company of Minneapolis, Minn. or by strips of contact adhesive secured to the inside of mask 2 and protected before use by release strips.

When mask 2 is formed of a low cling material such as vinyl, cling can be increased by coating the inside surface of mask 2 or the contact areas of the face of dummy 1 with sterile petroleum jelly or other low aggressiveness adhesives.

Figure 6:
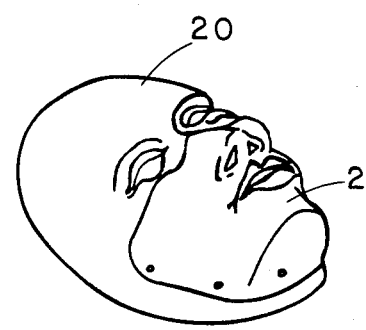
FIG. 6 is a pictorial view of the mask of this invention in place on a form.

In one embodiment of this invention, shown in FIG. 6, the inside face contact surfaces of mask 2 are coated with a low aggressiveness bonding agent such as the micro-encapsulated adhesives developed by the 3M Company of Minneapolis, Minn.

A stiff or rigid form 20 in the shape of the face area of CPR dummy 1 is coated in the mask receiving area with a release material such as a silicon composition. Mask 2 is placed in position on form 20. Form 20 serves the utility of a release backing for the inside adhesive coated surfaces of mask 2. Form 20 with mask 2 in position serves the additional utilities of protecting the filter chambers 10 and 11 of mask 2 from contamination and provides a practice aid for practicing the basics of CPR before going to the CPR dummy for a more complete simulation.

Mask 2 may be employed without filters in filter chambers 10 and 11. Filter chambers 10 and 11 are insertable into mouth 3 and nose 4 openings and are indexed to the mouth and nose geometries of CPR dummy head 1.

Filters 12 and 13 may be of the crimped paper type such as those used in cigarette filters or the open cell sponge type similar to those used in filters for small engines and appliances or they may be of a gauze material such as is used in surgical masks and the like. Filters 12 and 13 should possess the flexibility to permit easy insertion into their intended openings and should not significantly restrict the flow of air through the air passages.

However, one embodiment of this invention contemplates a filter element with restricted air flow. Such a filter is intended for use with the mask on form 20 and is intended to simulate the resistance to air flow presented by the lungs of an actual patient. The high resistance filters are replaceable with low resistance filters when mask 2 is used for more complete simulation in conjunction with a CPR dummy.

The above disclosure is enabling and discloses the best modes known to the inventor for practicing the invention. Numerous variants of the invention are clearly possible while remaining within the scope of the invention. To recite and illustrate the variants would greatly multiply the drawings and cause the specifications to become prolix.

Therefore, the scope of the invention should not be limited by the preferred embodiments and variations thereof disclosed, but rather, the scope of this invention should be limited by the scope of the appended claims and all equivalents thereto that would become obvious to one skilled in the art.

I claim:
1. A hygienic mask that is fitable to an existing CPR dummy and comprising;
   (a) a mask fabricated of a thin conformable material and having an inside surface and an outside surface,
   (b) air passages formed in the mask and the passages are indexable in air passages of a face of a CPR dummy, and the air passages have as a part thereof, filter chambers configured to receive and hold replaceable filters,
   (c) a cling producing means which causes the inside, face contacting surface of the mask to cling to the face of the CPR dummy, and
   (d) an attachment means distributed around the periphery of the mask whereby the periphery of the mask is releasably secured to the face portion of the CPR dummy and the attachment means is retrofitable to the face of an existing CPR dummy without permanent modification of the dummy.

2. The mask of claim 1 wherein the conformable material of which the mask is made is an accommodating and clinging material.

3. The mask of claim 2 wherein the inside surface of the mask is untalced and the outside, mouth and nose contact, surfaces of the mask are talced.

4. The mask of claim 1 wherein the attachment means are snap members positioned around the periphery of the mask and the snap members are detachably joinable with their mating snap members which are secured to the face of a CPR dummy.

5. The mask of claim I wherein the attachment means is a multiplicity of Velcro (TM) strips secured to the inside periphery of the mask and the strips are joinable with their mating Velcro (TM) strips secured to the face of a CPR dummy.

6. The mask of claim 1 wherein the attachment means is a multiplicity of strips of contact adhesive secured to the inside periphery of the mask and covered, before use, with release strips.

7. The mask of claim 1 wherein the cling providing means is a property that is inherent in the thin accommodating material of which the mask is fabricated.

8. The mask of claim 1 wherein the cling providing means is a coating of sterile petroleum jelly distributed over contact areas between the inside of the mask and the mask contact areas of the face of a CPR dummy.

9. The mask of claim 1 wherein the claim providing means is a low aggressiveness bonding agent.

10. The mask of claim 1 wherein the filter is a paper filter.

11. The mask of claim 1 wherein the filter is a sponge filter.

12. The mask of claim 1 wherein the filter is a gauze filter.

13. The mask of claim 1 wherein the mask is combined with a stiff form similar in configuration to the face of the CPR dummy the mask is to serve and the mask is positioned on the form as it would be positioned on the face of the CPR dummy.

14. A disposable mask which is fitable to an existing CPR dummy, comprising;
   (a) a mask for mouth and nose contact areas and their vicinities of a CPR dummy's face and the mask has a dummy's face contacting inside surface and a user's mouth contacting outside surface,
   (b) filter chambers incorporated into the structure of the mask and the filter chambers are indexable to mouth and nose air passages of a CPR dummy,
   (c) filters positioned in the filter chamber so as to permit the free passage of air through the mouth and nose air passages of the mask and the filters are of compressible materials, which permit the closing of the nose air passages by pinching the nose of the CPR dummy, and
   (d) the mask is detachably adhereable to the face of a CPR dummy in the mouth contact areas and their vicinities.

15. The mask of claim 14 wherein the mask is detachably adhereable to the face of a CPR dummy by means of the application of a low aggressiveness bonding agent, to contact areas between the inside of the mask and the area to be covered on the face of a CPR dummy.

16. The mask of claim 15 wherein the mask is provided with a stiff form in the shape of the face area of the CPR dummy for which the mask is intended and on which the mask will normally reside when not in use.

17. An hygienic disposable mask in combination with a CPR training dummy and comprising;
   (a) a CPR training dummy having a head and a face area as a part thereof and the face area has a user's mouth contact area associated with a mouth and a nose of the face of the dummy, and
   (b) a mask of flexible and accommodating material and the mask is shaped to conform to the contours of the user's mouth and nose contact areas of the face of the dummy and to be moveable therewith, and the mask has as a part thereof, filter chambers which are insertable into air passages which are a part of the nose and mouth structures of the CPR dummy and the filter chambers have positioned therein, filters which are of flexible materials, and the mask is detachably secureable to the mouth and nose contact areas of the dummy by securement means which are retrofitable to a CPR dummy without permanent modification of the dummy.

* * * * *